US011229161B1

(12) United States Patent
Patterson (10) Patent No.: US 11,229,161 B1
(45) Date of Patent: Jan. 25, 2022

(54) LAWN MOWING DEVICE

(71) Applicant: Dwayne Patterson, Mobile, AL (US)

(72) Inventor: Dwayne Patterson, Mobile, AL (US)

( * ) Notice: Subject to any disclaimer, the term of this patent is extended or adjusted under 35 U.S.C. 154(b) by 238 days.

(21) Appl. No.: 16/687,862

(22) Filed: Nov. 19, 2019

(51) Int. Cl.
*A01D 34/82* (2006.01)
*A01D 34/68* (2006.01)
*A01D 34/69* (2006.01)
*A01D 101/00* (2006.01)

(52) U.S. Cl.
CPC ....... *A01D 34/824* (2013.01); *A01D 34/6806* (2013.01); *A01D 34/69* (2013.01); *A01D 2034/6843* (2013.01); *A01D 2101/00* (2013.01)

(58) Field of Classification Search
CPC .. A01D 34/824; A01D 34/6806; A01D 34/69; A01D 34/6843; A01D 2101/00
See application file for complete search history.

(56) References Cited

U.S. PATENT DOCUMENTS

| 2,796,944 | A | * | 6/1957 | Clement, Jr. | ........ A01D 34/008 180/401 |
| 2,815,633 | A | * | 12/1957 | Meyer | ................. A01D 34/008 56/10.3 |
| 3,087,296 | A | | 4/1963 | Cowles | |
| 3,514,926 | A | * | 6/1970 | Heth | ...................... A01D 75/28 56/7 |
| 3,744,223 | A | | 7/1973 | Jensen | |
| 5,113,641 | A | | 5/1992 | Cook | |
| 5,749,207 | A | | 5/1998 | Coats | |
| 6,273,449 | B1 | * | 8/2001 | Harkcom | ............. A01B 73/005 280/463 |
| 8,079,433 | B2 | | 12/2011 | Teague | |
| 8,234,010 | B2 | | 7/2012 | Thompson | |
| 9,161,491 | B2 | | 10/2015 | Luschen | |
| 2007/0294991 | A1 | * | 12/2007 | Medina | .................. A01D 42/06 56/11.9 |
| 2019/0200511 | A1 | * | 7/2019 | Fay, II | .................... A01D 43/06 |
| 2019/0384287 | A1 | * | 12/2019 | Hyakusawa | ............ G06F 3/147 |
| 2021/0132624 | A1 | * | 5/2021 | Andriolo | ............... A47L 9/2852 |
| 2021/0255638 | A1 | * | 8/2021 | Ma | ....................... G05D 1/0234 |

* cited by examiner

*Primary Examiner* — Abigail A Risic
(74) *Attorney, Agent, or Firm* — Kyle A. Fletcher, Esq.

(57) ABSTRACT

The lawn mowing device comprises a mower and a controller. The lawn mowing device may be adapted to be operated by a user from a stationary position. Movements of the mower may be controlled from the stationary position using the controller. The mower may comprise a first engine for rotating a blade located under a deck of the mower and a second engine for propelling the mower forward. The controller may comprise a control bracket coupled to the top of the deck and a telescoping shaft that is coupled to the top of the control bracket via a universal joint. The user may control the movements of the mower by manipulating a distal end of the telescoping shaft.

17 Claims, 6 Drawing Sheets

LAWN MOWING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lawn maintenance equipment, more specifically, a lawn mowing device.

SUMMARY OF INVENTION

The lawn mowing device comprises a mower and a controller. The lawn mowing device may be adapted to be operated by a user from a stationary position. Movements of the mower may be controlled from the stationary position using the controller. The mower may comprise a first engine for rotating a blade located under a deck of the mower and a second engine for propelling the mower forward. The controller may comprise a control bracket coupled to the top of the deck and a telescoping shaft that is coupled to the top of the control bracket via a universal joint. The user may control the movements of the mower by manipulating a distal end of the telescoping shaft.

An object of the invention is to mown a lawn.

Another object of the invention is to control the movements of the mower from a stationary position.

A further object of the invention is to propel the mower forward using an engine.

Yet another object of the invention is to control the movements of the mower via a telescoping shaft.

These together with additional objects, features and advantages of the lawn mowing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the lawn mowing device in detail, it is to be understood that the lawn mowing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lawn mowing device.

It is therefore important that the claims be regarded as including such equivalent construction insofar as they do not depart from the spirit and scope of the lawn mowing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
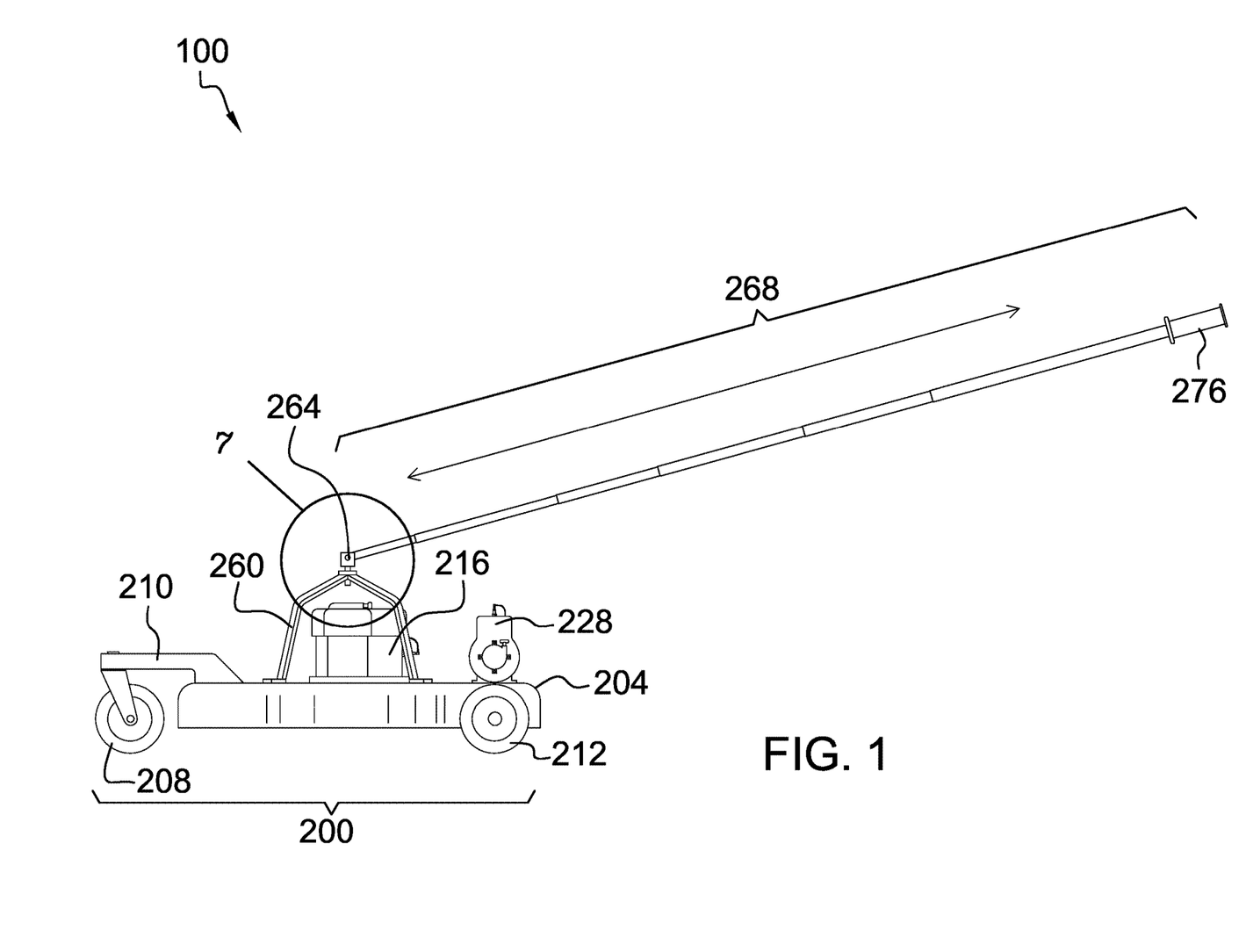
FIG. 1 is an in-use view of an embodiment of the disclosure.
Figure 2:
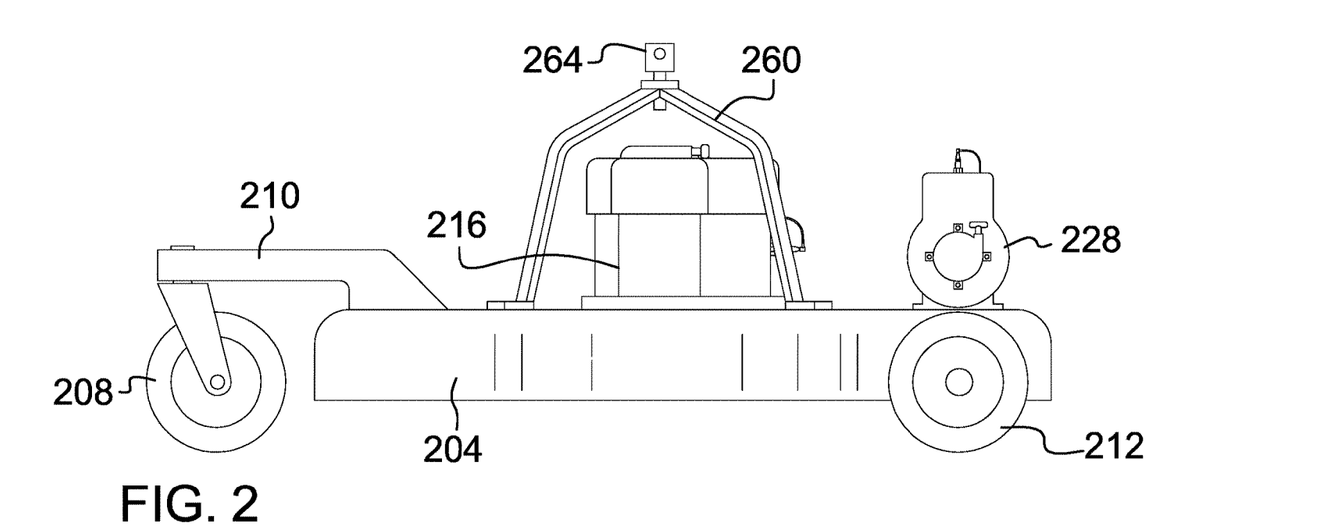
FIG. 2 is a left side view of an embodiment of the disclosure illustrating the mower and control bracket.
Figure 3:
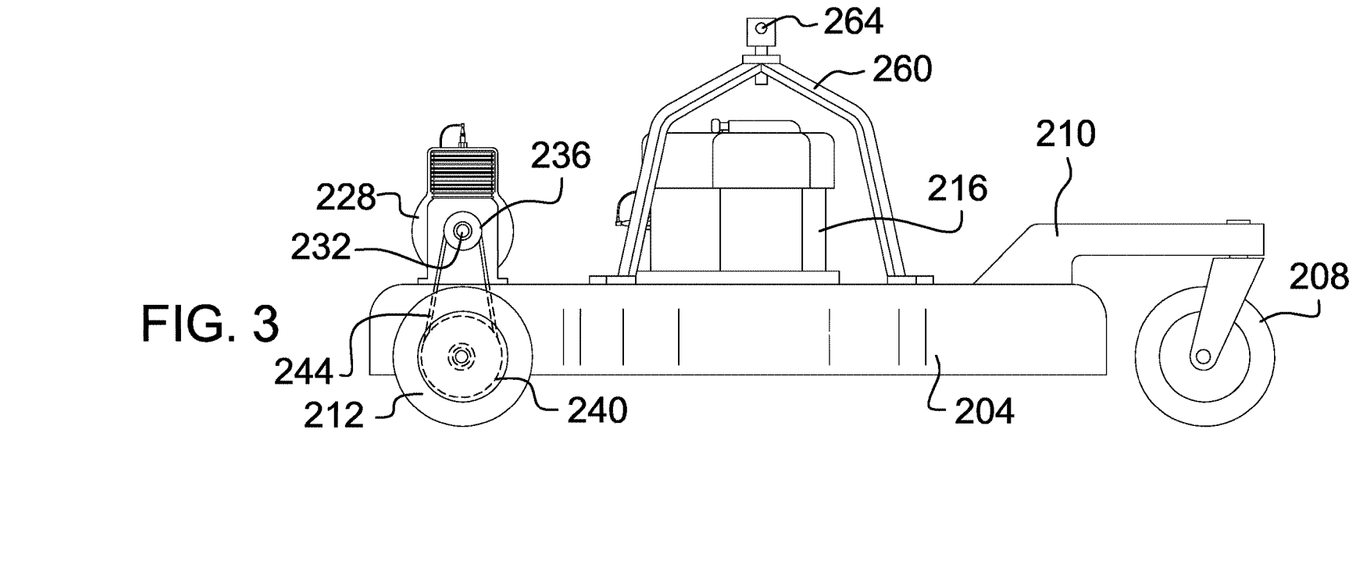
FIG. 3 is a right side view of an embodiment of the disclosure illustrating the mower and control bracket.
Figure 4:
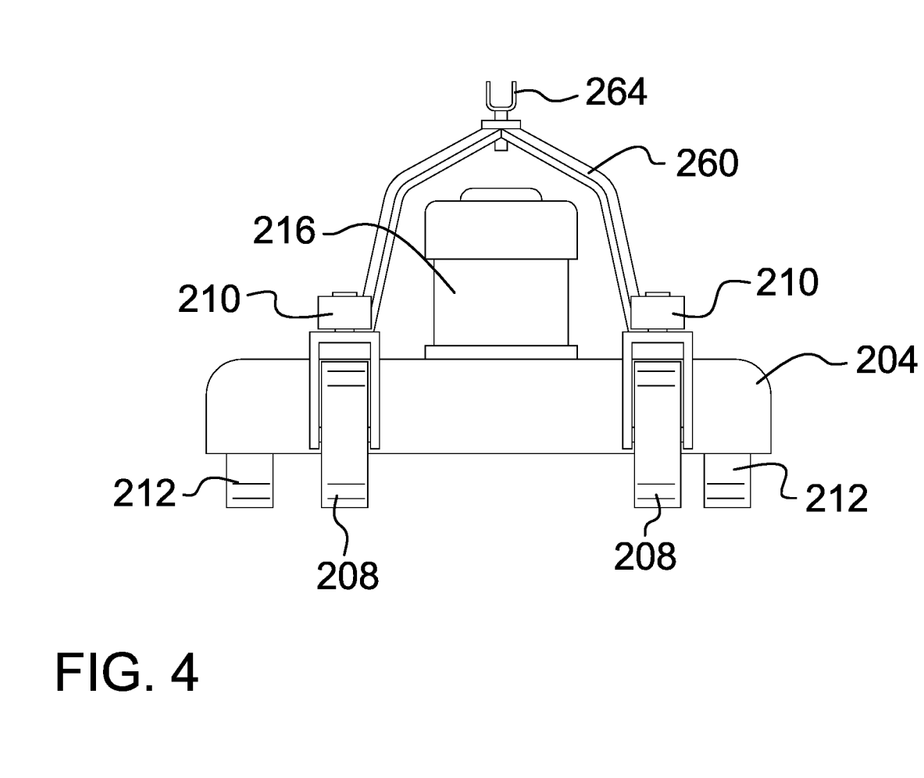
FIG. 4 is a front side view of an embodiment of the disclosure illustrating the mower and control bracket.
Figure 5:
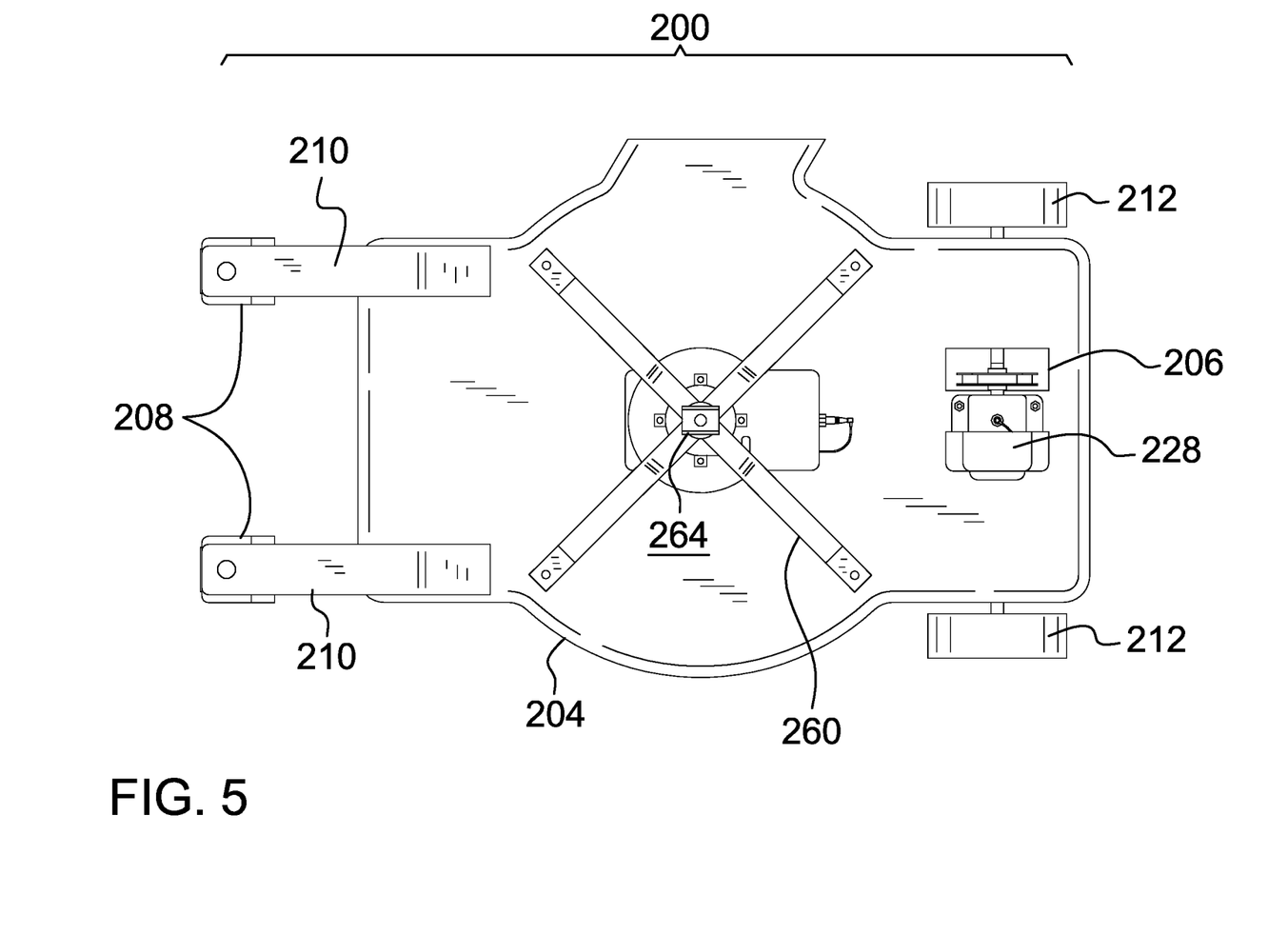
FIG. 5 is a top view of an embodiment of the disclosure illustrating the mower and control bracket.
Figure 6:
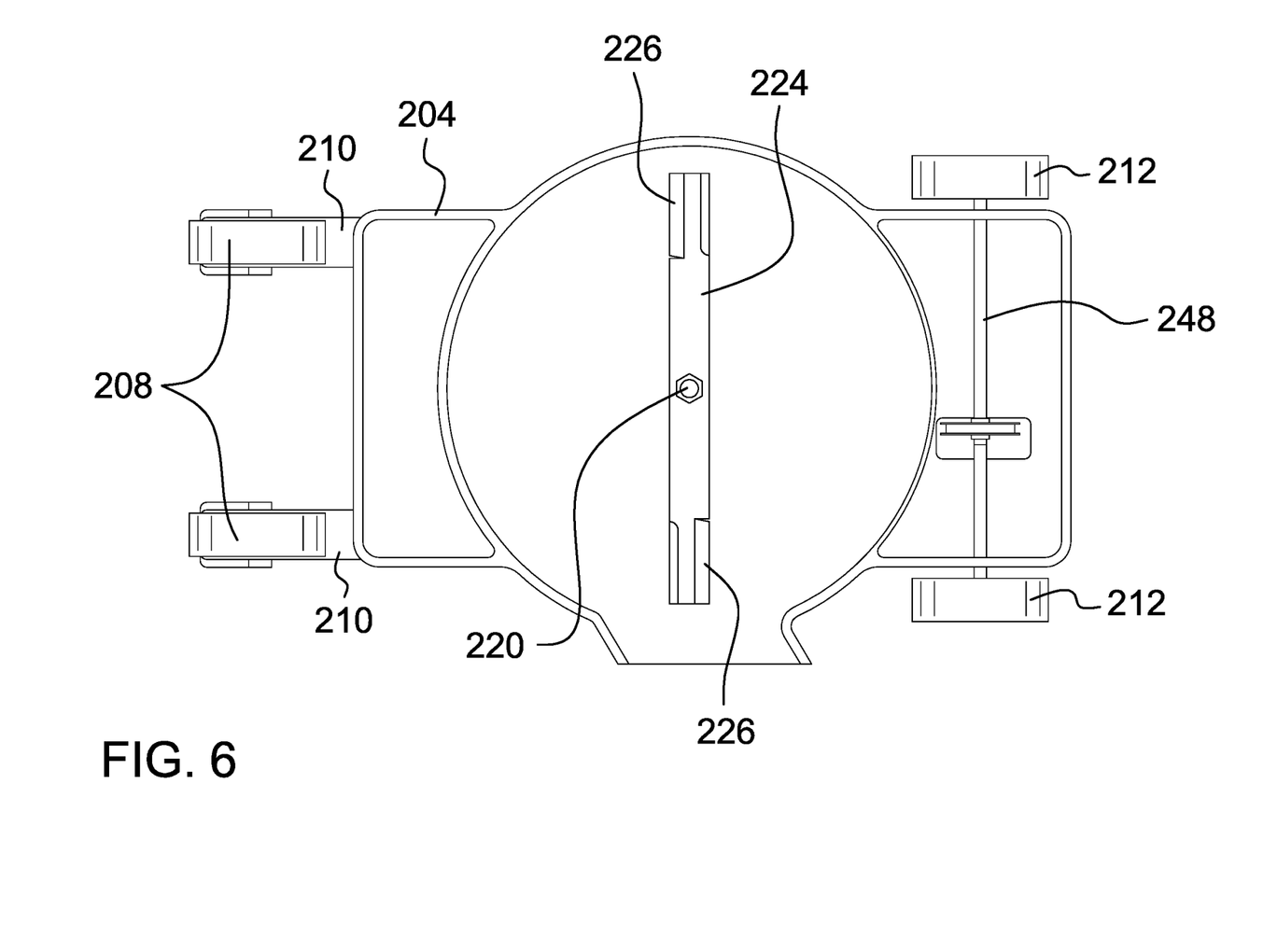
FIG. 6 is a bottom view of an embodiment of the disclosure illustrating the mower and control bracket.
Figure 7:
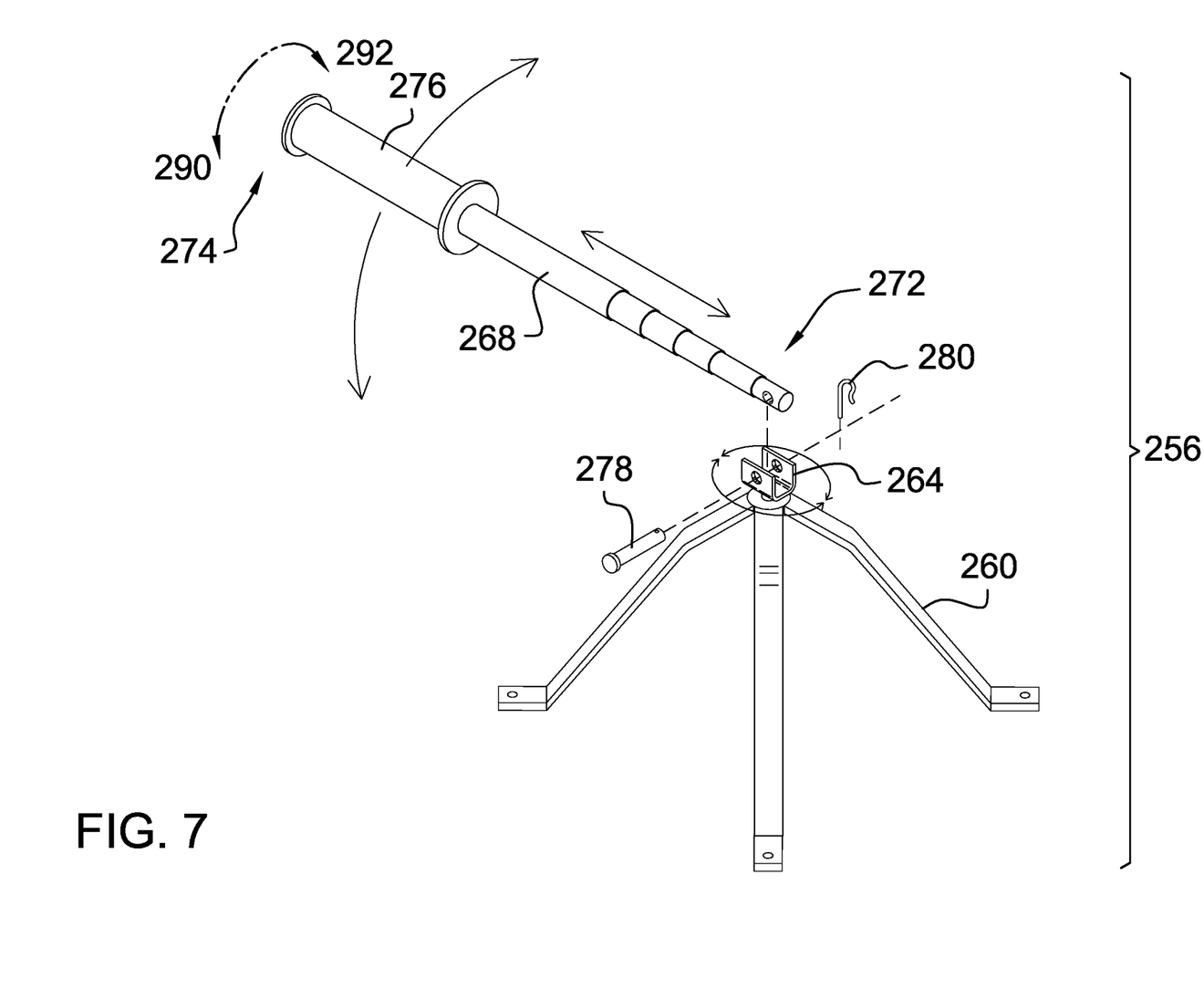
FIG. 7 is an exploded view of an embodiment of the disclosure illustrating the controller.

Detailed reference will now be made to a first potential embodiment of the disclosure, which is illustrated in FIGS. 1 through 7.

The lawn mowing device 100 (hereinafter invention) comprises a mower 200 and a controller 256. The invention 100 may be adapted to be operated by a user from a stationary position. Movements of the mower 200 may be controlled from the stationary position using the controller 256.

The mower 200 may comprise a deck 204, pair of front wheels 208, pair of rear wheels 212, a first engine 216, a blade 224, a second engine 228, an upper pulley 236, a lower pulley 240, a belt 244, and a rear axle 248. The mower 200 may cut grass of a lawn by passing the blade 224 over the lawn.

The deck 204 may be a body of the mower 200 upon which the pair of front wheels 208, the pair of rear wheels 212, the first engine 216, the second engine 228, and a control bracket 260 may be mounted. The deck 204 may be adapted to protect the user from the blade 224 and from debris ejected by the blade 224. The pair of front wheels 208 and the pair of rear wheels 212 may support the deck 204 above the lawn and may reduce the effort required to move the mower 200. The pair of front wheels 208 may be coupled to a pair of front wheel arms 210 which may project from the front of the deck 204. The pair of front wheels 208 may swivel such that the mower 200 may change direction. The pair of rear wheels 212 may be rotationally coupled to the deck 204 at the left and right rear corners of the deck 204 via the rear axle 248.

The first engine 216 may comprise a first shaft 220. The first engine 216 may cause rotation of the blade 224 when the first engine 216 is activated. The first engine 216 may be coupled to the top, center of the deck 204 with the first shaft oriented vertically. The bottom of the first shaft 220 may extend below the deck 204 where the first shaft 220 may couple to the blade 224. In some embodiments, the first engine 216 may be an internal combustion engine. The first engine 216 may be activated by supplying fuel from a fuel source, supplying electricity to a first spark plug, and turning the first shaft 220. As a non-limiting example, the first shaft 220 may be turned by pulling a cord on the top of the first engine 216. The first engine 216 may be deactivated by withholding the fuel or interrupting the flow of electricity to the first spark plug. In some embodiments, the fuel source may be an integral component of the first engine 216 or the second engine 228. In some embodiments, the fuel source may be shared by the first engine 216 and the second engine 228.

The blade 224 may be a cutting component of the mower 200. The center of the blade 224 may be coupled to the bottom of the first shaft 220 of the first engine 216. The blade 224 may be sharpened along leading edges 226 of the blade 224. The blade 224 may be rotate by the first engine 216 and when rotated the leading edges 226 of the blade 224 may trim the grass comprising the lawn beneath the blade 224. The blade 224 may be made of metal.

The second engine 228 may comprise a second shaft 232. The second engine 228 may cause rotation of the pair of rear wheels 212 when the second engine 228 is activated. The second engine 228 may be coupled to the top, rear of the deck 204 with the second shaft 232 oriented horizontally. In some embodiments, the second engine 228 may be an internal combustion engine. The second engine 228 may be activated by supplying the fuel from the fuel source, supplying electricity to a second spark plug, and turning the second shaft 232. As a non-limiting example, the second shaft 232 may be turned by pulling a cord on the second engine 228. The second engine 228 may be deactivated by withholding the fuel or interrupting the flow of electricity to the second spark plug.

The upper pulley 236 may be coupled to an end of the second shaft 232. The lower pulley 240 may be coupled to the rear axle 248. The belt 244 may movably couple the upper pulley 236 to the lower pulley 240 such that rotation of the upper pulley 236 by the second shaft 232 is conveyed to the lower pulley 240 and to the rear axle 248. In some embodiments, the belt 244 may pass through a belt aperture 206 in the deck 204 as the belt 244 travels between the upper pulley 236 and the lower pulley 240.

The rear axle 248 may be a horizontally-oriented shaft that is rotationally coupled to the deck 204 at the rear of the mower 200. The pair of rear wheels 212 may be coupled to the opposing ends of the rear axle 248 such that the pair of rear wheels 212 are located on the exterior of the deck 204 on each side of the deck 204.

The controller 256 may comprise the control bracket 260, a universal joint 264, and a telescoping shaft 268. The controller 256 may be adapted to allow the user to steer the mower 200 within a reachable zone from a distance. The reachable zone may be rectangular or circular.

The control bracket 260 may be one or more armatures coupled to the top of the deck 204. The control bracket 260 may position the universal joint 264 above the first engine 216.

The universal joint 264 may couple a proximal end 272 of the telescoping shaft 268 to the control bracket 260. The universal joint 264 may be adapted to permit the altitude angle and the azimuth angle of the telescoping shaft 268 to change as the mower 200 moves relative to the user.

The telescoping shaft 268 may comprise a hand grip 276, a clevis pin 278, and a cotter pin 280. The telescoping shaft 268 may be a shaft that is adapted to allow the user to control the movements of the mower 200. The proximal end 272 of the telescoping shaft 268 may be coupled to the universal joint 264. A distal end 274 of the telescoping shaft 268 may be adapted to be held by the user. A length of the telescoping shaft 268 may be variable as individual sections of the telescoping shaft 268 slide into and out of adjacent sections of the telescoping shaft 268. The distal end 274 of the telescoping shaft 268 may comprise the hand grip 276 for grasping the telescoping shaft 268 during operation of the mower 200.

In some embodiments, the maximum length of the telescoping shaft 268 may be 20 feet. In some embodiments, the length of the telescoping shaft 268 may be locked and unlocked. As a non-limiting example, the length may be locked by twisting the hand grip 276 in a first rotational direction 290. The length of the telescoping shaft 268 may be unlocked by twisting the hand grip 276 in a second rotational direction 292.

In some embodiments, coupling between the telescoping shaft 268 and the universal joint 264 may be the clevis pin 278 that is retained by the cotter pin 280.

In use, the first engine 216 and the second engine 228 may be started and the user may grasp the hand grip 276 located at the distal end 274 of the telescoping shaft 268. The user may assume the stationary position and begin mowing the reachable zone without moving from the stationary position. The second engine 228 may drive the pair of rear wheels 212 via the rear axle 248 to move the mower 200 forward. The user may redirect the mower 200 by pulling and pushing on the telescoping shaft 268. The user may occasionally change the length of the telescoping shaft 268. As a non-limiting example, the user may twist the hand grip 276 in the second rotational direction 292 to unlock the length of the telescoping shaft 268, pull or push the telescoping shaft 268 to change the length of the telescoping shaft 268, and then twist the hand grip 276 in the first rotational direction 290 to lock the length of the telescoping shaft 268. The mower 200 may mow a rectangular area by repeatedly allowing the mower 200 to travel in a straight line and then altering the direction and distance at the end of the straight cut. The mower 200 may mow a circular area by repeatedly allowing the mower 200 to travel around the user at a fixed distance and then increasing or decreasing the length of the telescoping shaft 268 for each subsequent pass around the user.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, the "altitude" or altitude angle, refers to an angle that is measured in a plane that is: 1) parallel to the force of gravity; and, 2) perpendicular to the azimuth. An altitude angle may be measured as the angular distance between horizontal and vertical, with horizontal corresponding to a 0 degree altitude angle and vertical corresponding to a 90 degree altitude angle.

As used in this disclosure, an "aperture" is an opening in a surface. Aperture may be synonymous with hole, slit, crack, gap, slot, or opening.

As used in this disclosure, an "axle" is a cylindrical shaft that is inserted through the center of an object such that the center axis of the object and the center axis of the axle are aligned and the object can rotate using the axle as an axis of rotation.

As used in this disclosure, the "azimuth" or azimuth angle, refers to an angle that is measured in a plane that is perpendicular to the either the vertical direction or the force of gravity.

As used in this disclosure, a "blade" is a term that is used to describe a wide and flat structure or portion of a larger structure. Non-limiting examples of object which are or which comprise blades may include a knife, a propeller, a shovel, an oar, or a cutting edge of a tool or razor.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used in this disclosure, a "cotter pin" is a metal shaft that is used to hold two mechanical components together.

As used herein, the words "couple", "couples", "coupled" or "coupling", refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, the word "exterior" is used as a relational term that implies that an object is not located or contained within the boundary of a structure or a space.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "grip" is a covering that is placed over a hand hold, handle, shaft, or other object.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, an "internal combustion engine" is an engine powered by burning fuel within the engine.

As used in this disclosure a "pulley" is a wheel with a grooved rim around which a cord (or other form of rope, line, belt, or cable) passes. The pulley may be used to change the direction of a force applied to the cord. In some embodiments, pulleys may be used in groups of two or more to convey a force from one pulley to all other pulleys in the group via a belt.

As used in this disclosure, the term "shaft" is used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, "telescopic", "telescoping", and "telescopically" refer to an object made of sections that fit or slide into each other such that the object can be made longer or shorter by adjusting the relative positions of the sections.

As used herein, "universal joint" refers to a joint or coupling that pivotably couples elements whose axes of rotation may be inclined to each other. Universal joints are often used to transfer rotary motion from a first shaft to a second shaft.

As used in this disclosure, "vertical" refers to a direction that is parallel to the local force of gravity. Unless specifically noted in this disclosure, the vertical direction is always perpendicular to horizontal.

As used in this disclosure, a "wheel" is a circular object that revolves around an axle or an axis and is fixed below an object to enable it to move easily over the ground.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A lawn mowing device comprising:
a mower and a controller;
wherein the lawn mowing device is adapted to be operated by a user from a stationary position;
wherein movements of the mower is controlled from the stationary position using the controller;

wherein the mower comprises a deck, pair of front wheels, pair of rear wheels, a first engine, a blade, a second engine, an upper pulley, a lower pulley, a belt, and a rear axle;

wherein the mower cuts grass of a lawn by passing the blade over the lawn;

wherein the first engine comprises a first shaft;

wherein the second engine comprises a second shaft;

wherein the upper pulley is coupled to an end of the second shaft;

wherein the lower pulley is coupled to the rear axle;

wherein the belt movably couples the upper pulley to the lower pulley such that rotation of the upper pulley by the second shaft is conveyed to the lower pulley and to the rear axle.

2. The lawn mowing device according to claim 1
wherein the deck is a body of the mower upon which the pair of front wheels, the pair of rear wheels, the first engine, the second engine, and a control bracket are mounted;

wherein the deck is adapted to protect the user from the blade and from debris ejected by the blade;

wherein the pair of front wheels and the pair of rear wheels support the deck above the lawn and reduce the effort required to move the mower.

3. The lawn mowing device according to claim 2
wherein the pair of front wheels are coupled to a pair of front wheel arms which project from the front of the deck;

wherein the pair of front wheels swivel such that the mower changes direction;

wherein the pair of rear wheels are rotationally coupled to the deck at the left and right rear corners of the deck via the rear axle.

4. The lawn mowing device according to claim 3
wherein the first engine causes rotation of the blade when the first engine is activated;

wherein the first engine is coupled to the top, center of the deck with the first shaft oriented vertically;

wherein the bottom of the first shaft extends below the deck where the first shaft couples to the blade.

5. The lawn mowing device according to claim 4
wherein the first engine is an internal combustion engine.

6. The lawn mowing device according to claim 4
wherein the blade is a cutting component of the mower;

wherein the center of the blade is coupled to the bottom of the first shaft of the first engine;

wherein the blade is sharpened along leading edges of the blade;

wherein the blade is rotate by the first engine and when rotated the leading edges of the blade trim the grass comprising the lawn beneath the blade.

7. The lawn mowing device according to claim 6
wherein the second engine causes rotation of the pair of rear wheels when the second engine is activated;

wherein the second engine is coupled to the top, rear of the deck with the second shaft oriented horizontally.

8. The lawn mowing device according to claim 7
wherein the second engine is an internal combustion engine.

9. The lawn mowing device according to claim 7
wherein the belt passes through a belt aperture in the deck as the belt travels between the upper pulley and the lower pulley.

10. The lawn mowing device according to claim 9
wherein the rear axle is a horizontally-oriented shaft that is rotationally coupled to the deck at the rear of the mower;

wherein the pair of rear wheels are coupled to the opposing ends of the rear axle such that the pair of rear wheels are located on the exterior of the deck on each side of the deck.

11. The lawn mowing device according to claim 10
wherein the controller comprises the control bracket, a universal joint, and a telescoping shaft;

wherein the controller is adapted to allow the user to steer the mower within a reachable zone from a distance.

12. The lawn mowing device according to claim 11
wherein the control bracket is one or more armatures coupled to the top of the deck;

wherein the control bracket positions the universal joint above the first engine.

13. The lawn mowing device according to claim 12
wherein the universal joint couples a proximal end of the telescoping shaft to the control bracket;

wherein the universal joint is adapted to permit the altitude angle and the azimuth angle of the telescoping shaft to change as the mower moves relative to the user.

14. The lawn mowing device according to claim 13
wherein the telescoping shaft comprises a hand grip, a clevis pin, and a cotter pin;

wherein the telescoping shaft is a shaft that is adapted to allow the user to control the movements of the mower;

wherein the proximal end of the telescoping shaft is coupled to the universal joint;

wherein a distal end of the telescoping shaft is adapted to be held by the user;

wherein a length of the telescoping shaft is variable as individual sections of the telescoping shaft slide into and out of adjacent sections of the telescoping shaft;

wherein the distal end of the telescoping shaft comprises the hand grip for grasping the telescoping shaft during operation of the mower.

15. The lawn mowing device according to claim 14
wherein the maximum length of the telescoping shaft is 20 feet.

16. The lawn mowing device according to claim 14
wherein the length of the telescoping shaft is locked and unlocked.

17. The lawn mowing device according to claim 16
wherein the length is locked by twisting the hand grip in a first rotational direction;

wherein the length of the telescoping shaft is unlocked by twisting the hand grip in a second rotational direction.

* * * * *